Figure 1:
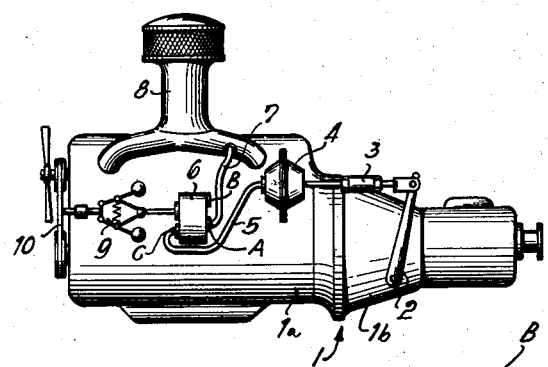

Sept. 29, 1959 R. BINDER 2,906,279
VALVE DEVICE
Filed March 26, 1956 3 Sheets-Sheet 1

INVENTOR:
Richard Binder
By:
Michael S. Stricker
agt.

Sept. 29, 1959   R. BINDER   2,906,279
VALVE DEVICE
Filed March 26, 1956   3 Sheets-Sheet 2

INVENTOR.
Richard Binder
BY:
Michael S. Striker
agt.

Sept. 29, 1959  R. BINDER  2,906,279
VALVE DEVICE

Filed March 26, 1956  3 Sheets-Sheet 3

INVENTOR:
Richard Binder
By: Michael S. Struker
agt.

United States Patent Office 2,906,279
Patented Sept. 29, 1959

2,906,279

VALVE DEVICE

Richard Binder, Schweinfurt (Main), Germany

Application March 26, 1956, Serial No. 573,793

Claims priority, application Germany March 24, 1955

3 Claims. (Cl. 137—54)

The present invention relates to a valve device.

More particularly, the present invention relates to a valve device which is adapted to be incorporated in an engine and clutch arrangement.

It is an object of the present invention to provide a valve device which is particularly adapted to control a fluid pressure operated device which moves a clutch between its engaged and disengaged conditions.

It is another object of the present invention to provide a valve device which serves smoothly and automatically to control a fluid pressure operated device which moves a clutch between its engaged and disengaged conditions.

The objects of the present invention also include the provision of a rotational speed responsive valve device which serves to control a fluid pressure operated device by means of which a clutch is moved between its engaged and disengaged conditions.

It is yet another object of the present invention to provide a valve device which is rugged, which incorporates a minimum number of parts, which may be constructed at low cost, and which will give long periods of trouble-free service.

With the above objects in view, the present invention mainly resides in a valve device which comprises a valve housing; a pair of conduit means for placing the interior of the valve housing in communication with a pair of fluid pressure sources, respectively; a pair of valve means associated with the pair of conduit means, respectively, for opening and closing the same; condition responsive operating means operatively associated with both of the valve means for moving the same between their open and closed positions in accordance with a predetermined pattern and as a function of the condition to which the operating means is responsive; and third conduit means for placing the interior of the valve housing in communication with a fluid pressure operated device, so that the latter is subjected to a pressure which is dependent upon the condition.

Also, the present invention mainly resides in that combination of elements in an engine and clutch arrangement wherein the clutch is movable between engaged and disengaged conditions and is continuously biased into one of these conditions, which combination of elements comprises in addition to a valve device such as is set forth above, at least one fluid pressure source for supplying a pressure fluid medium at an operating pressure different from atmospheric pressure, and a fluid pressure operated device connected to the clutch and being so constructed and arranged that when the fluid pressure operated device is subjected to atmospheric pressure, the clutch is maintained in its one condition by the action of the force biasing it thereinto and when the fluid pressure operated device is subjected to the action of a fluid medium at the operating pressure, the clutch is maintained in the other of its conditions against the action of the force biasing the clutch into its one condition. The arrangement of the parts is such that the rotational speed of the engine controls the valve device so as to place the fluid pressure operated device either in communication with the fluid pressure source or with atmosphere, depending upon the rotational speed of the engine. In this way, the rotational speed of the engine controls the condition of the clutch.

Figure 2:
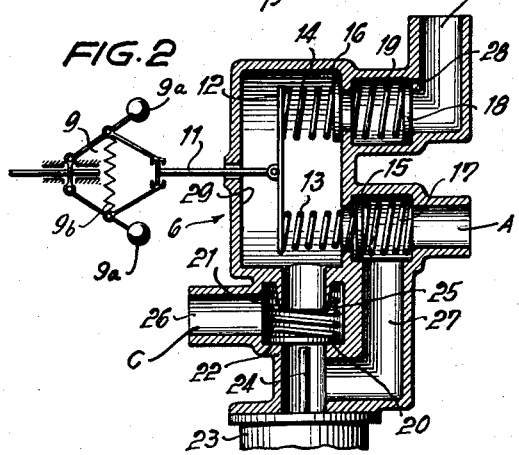
Figure 3:
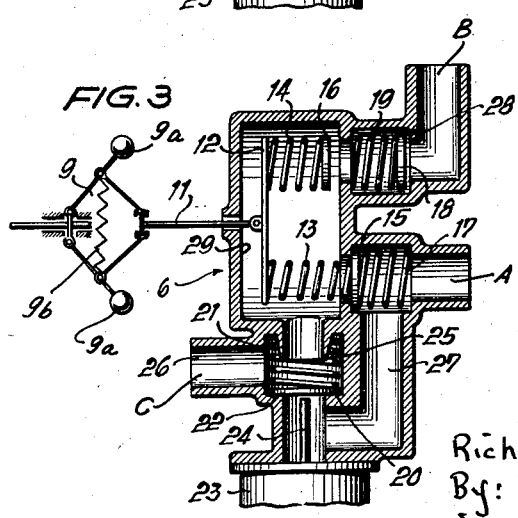
Figure 4:
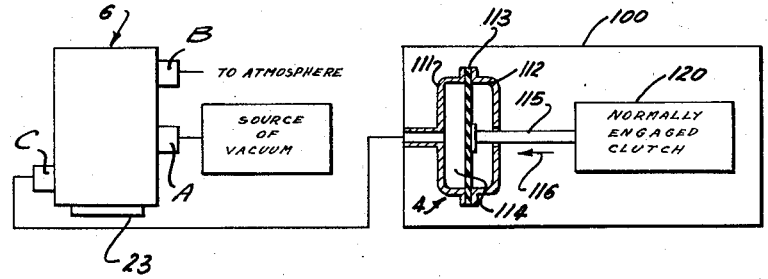
Figure 5:
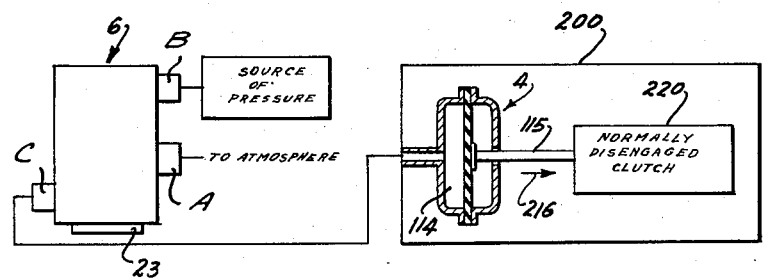
Figure 8:
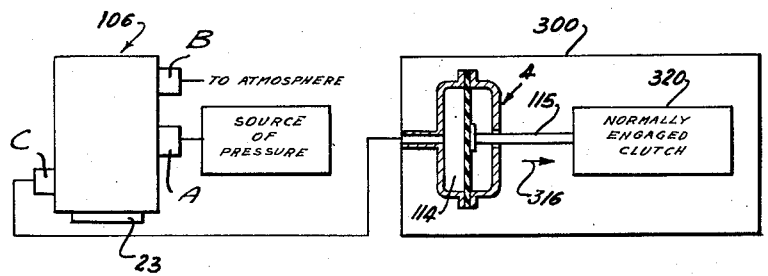
Figure 9:
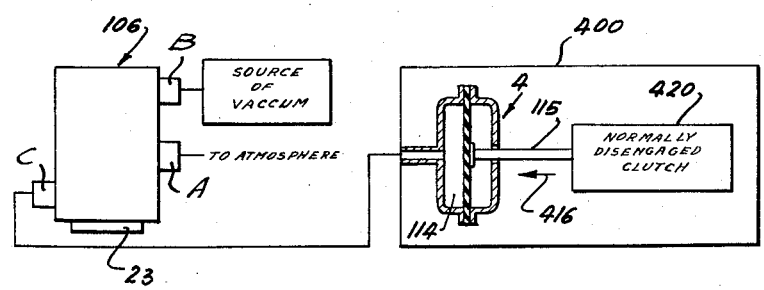
Figure 6:
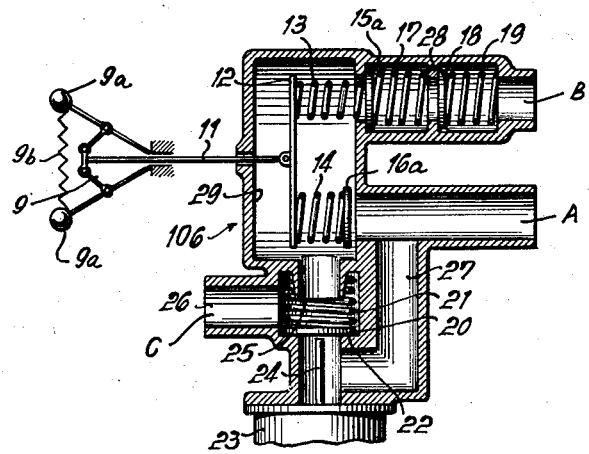
Figure 7:
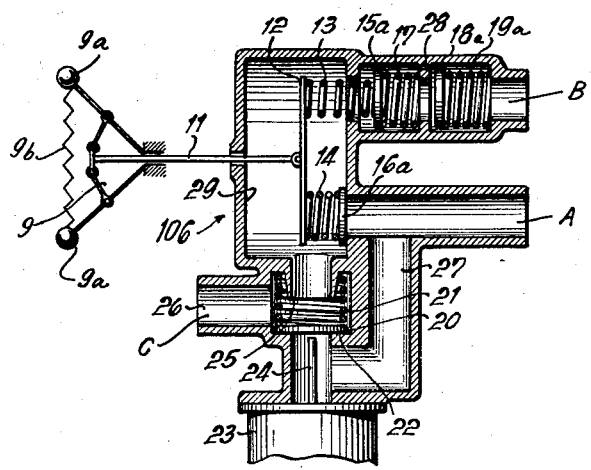

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic elevational view of an engine and clutch arrangement according to the present invention;

Figs. 2 and 3 are sectional views, the parts being shown in different operative positions, of a valve device adapted to be used in conjunction with a clutch arrangement wherein a normally engaged clutch may be moved to disengaged condition by applying a vacuum, and also in conjunction with a clutch arrangement wherein a normally disengaged clutch may be moved to engaged position by applying a pressure greater than atmospheric;

Figs. 4 and 5 are schematic views of the valve device shown in Figs. 2 and 3 viewed in conjunction with two different types of clutch arrangements;

Figs. 6 and 7 are sectional views, the parts being shown in different operative positions, of another preferred embodiment of a valve device according to the present invention which valve device is adapted to be used in conjunction with a clutch arrangement wherein a normally engaged clutch may be moved to disengaged position by applying a pressure greater than atmospheric, and also in conjunction with a clutch arrangement wherein a normally disengaged clutch may be moved to engaged position by applying a vacuum; and Figs. 8 and 9 are schematic views of the valve device shown in Figs. 6 and 7 used in conjunction with two different types of clutch arrangements.

Referring now to the drawings, and to Fig. 1 thereof in particular, there is shown an engine and clutch arrangement 1 incorporating an internal combustion engine 1a and a clutch device 1b. The latter is actuated by a lever 2 which is connected to a fluid pressure operated device 4 by means of a connecting link 3. The device 4 communicates with a connecting stud or conduit C of a valve device 6 by means of a conduit 5. The valve device 6 is also formed with a connecting stud or conduit A which, by way of a connecting conduit 7, is in communication with the intake or intake manifold 8 of the engine 1a. The valve device 6 is adapted to be placed in communication with atmosphere by way of the connecting stud or conduit B.

The valve device 6, the internal construction of which will be described below, is adapted to place the fluid pressure operated device 4 in communication either with the intake 8 of the engine 1a or with atmosphere, the connections effected by the valve device 6 being controlled by the rotational speed responsive centrifugally actuated device 9. The latter is driven by the fan belt 10 of the engine, so that the device 9 and consequently the connections effected by the valve device 6 are controlled by the rotational speed of the engine 1a.

Referring now to Figs. 2 and 3, it will be seen that the centrifugally actuated device 9 is formed with weights 9a which are centrifuged outwardly to an extent determined by the rotational speed of the engine, a spring 9b being provided to pull the weights toward each other when the engine is at a standstill or operates below a predetermined rotational speed, as, for example, normal idling speed. The centrifugally operated device 9 is connected to a rod 11 which projects into the interior of the valve housing 29 of the valve device 6, the right hand free end of the rod, as viewed in the drawings, being connected to a bridge 12. The latter carries connecting elements constituted by springs 13 and 14 which carry valves 15 and 16, respectively, the valve 15 being constantly urged toward its closed position by a spring 17. As may readily be seen from the drawings, the valves 15 and 16 are adapted to open and close the conduits A and B, respectively.

An additional valve 18 is arranged in the conduit B and is constantly urged to its closed position by a spring 19, a bleed hole 28 being provided to bypass the valve 18.

Moreover, the valve housing 29 is formed with a connecting conduit 27 which places the conduits A and C in communication with each other. A valve 20 is movable between a rest position wherein a spring 21 holds the valve 20 upon the valve seat 22 and an actuated position wherein a plunger 24 operated by a solenoid 23 presses the valve 20 against the valve seat 25. Thus, when the valve 20 is in its rest position, the conduit C while being in communication with the interior of the valve housing 29, is out of communication with the connecting conduit 27. However, when the valve 20 is in its actuated position, the conduit C is out of communication with the interior of the valve housing 29 but in communication with the connecting conduit 27 and consequently with the conduit A.

Irrespective of whether the clutch 1b is a normally engaged clutch or a normally disengaged clutch, i.e., a clutch which is continuously spring-biased into either its engaged or disengaged position, and irrespective of whether a source of pressure greater than atmospheric or a source of vacuum is utilized to move the clutch out of that position in which it is normally maintained, the arrangement of the parts is such that when the engine 1a is at a standstill or rotates below a predetermined rotational speed, the clutch is in its disengaged position whereas when the engine rotates at at least the predetermined rotational speed, the clutch is automatically moved to its engaged position. Additionally, means are provided for moving the clutch to its disengaged position even when the engine rotates at at least this predetermined rotational speed.

The valve device illustrated in Figs. 2 and 3 is capable of being used in conjunction with a clutch arrangement which incorporates a normally engaged clutch adapted to be moved into disengaged position upon application of a vacuum, or with a clutch arrangement incorporating a normally disengaged clutch adapted to be moved into engaged position upon application of a pressure greater than atmospheric.

In Fig. 4, the valve device 6 shown in Figs. 2 and 3 is shown in conjunction with a normally engaged clutch adapted to be moved to disengaged position upon application of a vacuum.

The conduit A is placed in communication with a suitable source of vacuum, as, for example, the intake or intake manifold of the engine, as is shown in Fig. 1. The conduit B is in communication with atmosphere, and the conduit C is in communication with the fluid pressure operated device 4. The latter includes a pair of shells 111 and 112 between which a diaphragm 113 is interposed. The shell 111 and diaphragm 113 form a chamber 114, and it is with this chamber that the conduit C is in communication. A rod 115 is connected to the diaphragm 113 and is movable therewith, the right end of the rod 115, as viewed in the drawings, being connected to a normally engaged clutch 120, i.e., a clutch device wherein springs or other means normally maintain the clutch in its engaged position. The arrangement of the parts is such that when the rod 115 is moved leftwardly in the direction of the arrow 116, the clutch 120 is moved to its disengaged position and maintained therein against the action of the force normally maintaining the clutch in its engaged position. It will be seen, therefore, that the clutch 120 will be moved to its disengaged position when the chamber 114 is evacuated. Thus, the fluid pressure operated device 4 and the normally engaged clutch 120 together constitute a clutch device 100 which is normally in engaged condition and is adapted to be moved into its disengaged condition upon the application of a vacuum.

The operation of the device is as follows:

When the engine 1a rotates below the predetermined rotation speed, the valve device 6 assumes the position illustrated in Fig. 2. In this position the springs 13 and 14 are compressed and assume their shortest axial lengths. The spring 13 overcomes the force of the spring 17, thereby maintaining the valve 15 in its open position, and the spring 14 serves firmly to press the valve 16 into its closed position. Thus, the interior of the valve housing 29 is out of communication with atmosphere but in communication with the source of vacuum. With the valve 20 being in its rest position, the chamber 114 is thus evacuated, and the diaphragm 113 bulges leftwardly, thereby maintaining the normally engaged clutch 120 in its disengaged condition. When the engine 1a rotates at at least the predetermined speed, the weights 9a are centrifuged outwardly so that the parts move from the position illustrated in Fig. 2 to that illustrated in Fig. 3. Thus, the lengths of the springs 13 and 14 are increased gradually, the valve 15 closing at the same rate at which the valve 16 opens. In this way, the vacuum within the valve housing 20 is gradually reduced, i.e., the interior of the valve housing 29 is gradually vented to atmosphere, thereby bringing about a gradual pressure increase in the chamber 114. The clutch 120 is thus gradually moved from its disengaged condition to its engaged condition.

If, during movement of the clutch 120 from its disengaged to its engaged condition, the rotational speed of the engine 1a is decreased to a rotational speed below the predetermined one, the parts are returned quickly to the position illustrated in Fig. 2, which serves once again to move the clutch 120 back to its disengaged position.

If it is desired to move the clutch to its disengaged position at such time as the engine 1a rotates at at least the predetermined speed, the solenoid 23 is actuated, thereby causing the plunger 24 to move the valve 20 out of its rest position into its actuated position. In this way, the chamber 114 is placed in communication with the source of vacuum, thereby moving the clutch 120 into its disengaged condition. Upon deenergization of the solenoid 23, the valve 20 is moved back into its rest position by the spring 21, thereby once again placing the chamber 114 into communication with the interior of the valve housing 29. However, a too great or too sudden surge of air at atmospheric pressure into the interior of the valve housing 29 is prevented by the valve 18. Thus, the inrushing air is throttled by the valve 18, a relatively slow ingress of air being afforded by the bleed hole 28. Thus, the clutch 120 is again moved gradually from its disengaged to its engaged condition.

In practice, the instant engine and clutch arrangement may be incorporated in a motor vehicle or the like which incorporates a gear shift, and the solenoid 23 may be electrically connected to the gear shift in such a manner that the solenoid 23 is actuated when the gear shift is manipulated in order to shift gears. In this way, the clutch 120 will, irrespective of the rotational speed of the engine 1a, be moved to disengaged condition upon actuation of the gear shift.

As set forth above, the valve device 6 assumes the position shown in Fig. 2 when the engine rotates below the predetermined speed and the position shown in Fig. 3 when the engine rotates at at least this speed. In Fig. 2, the valve 15 is in its open position and is shown as being spaced from its valve seat and the valve 16 is in its closed position and is shown as being in engagement with its valve seat, whereas in Fig. 3 the valve 15 is in its closed position and is shown as being in engagement with its valve seat and the valve 16 is in its open position and is shown as being spaced from its valve seat. In practice, however, the length of the spring 13 may be such that even when the valve device 6 assumes the position shown in Fig. 2, the valve 15 is in physical engagement with its valve seat. However, the axial length of the spring 13 when the valve device occupies the position shown in Fig. 2, is at its shortest and consequently applies the greatest possible pressure on the valve 15. The force of the spring 17 is thus almost completely counter-acted so that while the valve 15 is physically closed, it is held closed with but a very small or minimal pressure, and will readily open when the pressure in the conduit A is only slightly less than that prevailing in the interior of the valve housing 29.

When the engine rotates at at least the predetermined speed, the valve device occupies the position shown in Fig. 3, and in this position the length of the spring 13 is at its greatest. Consequently, the force exerted by the spring 13 on the valve 15 is at its smallest, and the spring 17 is capable of holding the valve 15 closed even though a relatively large pressure differential exists in the conduit A and the interior of the valve housing 29.

Similarly, the spring 14 is compressed most when the valve device 6 occupies the position shown in Fig. 2, so that the valve 16 is held closed with the greatest possible force and is maintained closed even though a relatively large pressure differential prevails between the conduit B and the interior of the valve housing 29. However the length of the spring 14 may be such that even when the valve device 6 occupies the position shown in Fig. 3, the valve 16 will be held in physical contact with its valve seat. It will be held in such position with but a minimal force, so that a pressure in the conduit B which is slightly higher than that prevailing within the valve housing 29 will be sufficient to move the valve 16 away from its valve seat.

It will be seen from the above the valves 15 and 16 may in effect occupy "open" positions notwithstanding the fact that they are in physical contact with their respective valve seats. Thus, the term "open position" as used throughout the instant specification and claims is deemed to include that position of the valves 15 and 16 wherein these valves are in physical contact with their respective valve seats but are maintained in such contact with but a minimal force, which condition occurs when the spring 13 is at its shortest length (Fig. 2) and when the spring 14 is at its greatest length (Fig. 3).

Fig. 5 shows the valve device 6 used in conjunction with a clutch arrangement 200 which incorporates a normally disengaged clutch 220 that is adapted to be moved to its engaged position when the rod 115 is moved rightwardly in the direction of the arrow 216. Thus, the clutch arrangement 200 is a normally disengaged one adapted to be moved to engaged condition upon the application of a pressure greater than atmospheric. Thus, the conduit A of the valve device 6 is placed in communication with atmosphere and the conduit B is placed in communication with a source of pressure fluid medium at a pressure greater than atmospheric. In view of the fact that the pressure communicating with the conduit B is greater than that communicating with the conduit A, the mode of operation of the arrangement illustrated in Fig. 5 is basically identical to that of the arrangement illustrated in Fig. 4. When the engine 1a rotates below the predetermined speed, the chamber 114 is in communication with atmosphere so that the normally disengaged clutch is permitted to remain in its disengaged condition by the force biasing the clutch thereinto. When the engine 1a rotates at at least the predetermined speed, the chamber 114 of the fluid pressure operated device 4 is placed in communication with the source of pressure, thereby causing the diaphragm 113 to bulge rightwardly so as to move the normally disengaged clutch 220 into its engaged condition. It will be seen that when the engine rotates at at least the predetermined speed and the solenoid 23 is actuated, the chamber 114 is vented to atmosphere, thereby the clutch 220 to be moved into its disengaged position by its biasing force.

The valve device 106 shown in Figs. 6 and 7 differs from the valve device 6 in that when the weights 9a of the rotational speed responsive device 9 are centrifuged outwardly, the rod 11 is moved leftwardly, as viewed in the drawings. Thus, the valve 15a interposed between the springs 13 and 17 is maintained in closed position by the latter spring when the engine rotates below the predetermined speed and the valve 16a is maintained in its open position by the spring 14. When the engine rotates at at least the predetermined speed, the spring 13 overcomes the spring 17 so as to move the valve 15a into its open position, and the valve 16a is maintained in its closed position. As in the above described embodiment, gradual opening of one valve is accompanied by a gradual closing of the other.

Additionally, the valve device 106 differs from the valve device 6 in that the valve 18a which is biased into its closed position by the spring 19a prevents too great or too sudden an outward, rather than inward, rush of air.

As is illustrated in Fig. 8, the valve device 106 is adapted to be used in conjunction with a clutch arrangement 300 incorporating a normally engaged clutch 320 adapted to be moved into its disengagement upon movement of the rod 115 in the direction of the arrow 316. Thus, the clutch arrangement 300 is a normally engaged one adapted to be disengaged upon the application of a pressure greater than atmospheric. The conduit A is therefore connected to a suitable source of pressure fluid medium at a pressure greater than atmospheric and the conduit B is vented to atmosphere. It will be understood, therefore, that when the engine 1a rotates below the predetermined rotational speed, the valve device 106 will assume the position illustrated in Fig. 6, so that the chamber 114 is in communication with the source of pressure. The normally engaged clutch is therefore moved into and maintained in its disengaged position. When the engine rotates at at least the predetermined speed, however, the valve device 106 assumes the position illustrated in Fig. 7 so that the chamber 114 is vented to atmosphere, thereby enabling the clutch 320 to be moved back into its engaged position by the force normally biasing the clutch thereinto. Also, it will be understood that when the solenoid 23 is actuated, the chamber 114 will be placed in communication with the source of pressure, irrespective of the rotational speed of the engine.

In the arrangement illustrated in Fig. 9, the valve device 106 is used in conjunction with a clutch arrangement 400 incorporating a normally disengaged clutch 420 adapted to be moved into engaged condition when the rod 115 is moved leftwardly in the direction of the arrow 416. Thus, the clutch arrangement 400 is a normally disengaged one adapted to be moved to engaged condition upon the application of a vacuum. Consequently, the conduit A of the valve device 106 is placed in communication with atmosphere and the conduit B is placed in communication with a source of vacuum, as, for example, the intake or intake manifold of the engine. It will be understood that when the engine rotates below the predetermined speed the chamber 114 is in communication with atmosphere so that the clutch 420 is maintained in its disengaged condition by its own biasing force. When the engine rotates above the predetermined speed, however, the chamber 114 is placed in communication with the source of vacuum, thereby evacuating the chamber 114 and causing the clutch 420 to assume its engaged condition. Moreover, when the solenoid 23 is actuated, the chamber 114 is placed in communication with atmosphere, irrespective of the rotational speed of the engine, thereby permitting the clutch 420 to assume its disengaged condition under the influence of its own biasing force.

It will be understood that inasmuch as the conduit A is maintained in communication with a higher pressure than the conduit B, the valve 18a serves as a throttling valve in the manner of the valve 18 described above.

In each of the above described arrangements the atmosphere is utilized as one of the sources of fluid pressure, the other source being constituted by a source of vacuum or a source capable of delivering fluid under pressure greater than atmospheric. It has been mentioned that the intake of the internal combustion engine may constitute the source of vacuum, but it will be understood that an entirely independent suction device or source of vacuum may be relied on instead. Also it will be understood that any suitable source of pressure may be used to deliver a fluid medium at pressure greater than atmospheric, as, for example, an accumulator. Also, it is within the scope of the present invention to provide two separate pressure sources other than atmosphere capable of supplying fluid media, either gaseous or liquid, at different pressures, the term "pressure" as used throughout the instant specification and claims being deemed to include a pressure or pressures below atmospheric pressure, i.e. a vacuum.

It will be understood that each of the elements described above, or two or more together, may also find a useful application in other types of engine and clutch arrangements differing from the types described above.

While the invention has been illustrated and described as embodied in an engine and clutch arrangement adapted to be used in a motor vehicle or the like, it is not intended to be limited to the details shown, since various modifications and structural changes may be made without departing in any way from the spirit of the present invention.

Without further analysis, the foregoing will so fully describe the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A valve device comprising, in combination, a valve housing; first and second conduit means for placing the interior of said valve housing in communication with first and second fluid pressure sources, respectively; first valve means associated with said first conduit means and movable between open and closed positions; second valve means associated with said second conduit means and movable between open and closed positions; a rotational-speed responsive operating member linearly reciprocable between two positions and connected to a rotatable member in such a manner that when the latter rotates below a predetermined rotational speed, said operating member is in one of its positions and when the rotatable member rotates at at least said rotational speed, said operating member is in the other one of its positions; and connecting means arranged in the interior of said valve housing for interconnecting said operating member and said first valve means for joint linear movement in such a manner that when said operating member is in its one position, said first valve means is in its open position and when said operating member is in its other position, said first valve means is in its closed position, and for interconnecting said operating member and said second valve means in such a manner that when said operating member is in its one position, said second valve means is in its closed position and when said operating member is in its other position, said second valve means is in its open position, said connecting means including first spring means which, when said operating member is in one of its two positions, resiliently presses the corresponding valve means into its closed position and which, when said operating member is in the other of its two positions, maintains the corresponding valve means in its open position, and second spring means which, when said operating member is in the above-mentioned one of its two positions, resiliently presses the corresponding valve means into its open position against the action of an additional spring means constantly urging the last-mentioned corresponding valve means into its closed position and which, when said operating member is in the above-mentioned other of its two position, permits said additional spring means resiliently to press the last-mentioned valve means into its closed position.

2. The combination defined in claim 1 wherein said connecting means include a common connecting member attached to said operating member and to said first and second spring means.

3. A valve device as defined in claim 1, including additional valve means in at least one of said first and second conduit means for controlling the rate of fluid flow therethrough.

References Cited in the file of this patent

UNITED STATES PATENTS

| | | |
|---|---|---|
| 1,754,740 | Clarkson | Apr. 15, 1930 |
| 1,952,147 | Stahl | Mar. 27, 1934 |
| 2,058,550 | Baits | Oct. 27, 1936 |
| 2,109,070 | MacKenzie | Feb. 22, 1938 |
| 2,260,576 | Maybach | Oct. 28, 1941 |
| 2,263,047 | Newton | Nov. 18, 1941 |
| 2,395,671 | Kleinhans | Feb. 26, 1946 |
| 2,631,700 | Long et al. | Mar. 17, 1953 |
| 2,635,722 | Wemp | Apr. 21, 1953 |
| 2,765,893 | Stuart | Oct. 9, 1956 |